(12) United States Patent
Holguin

(10) Patent No.: US 7,782,023 B2
(45) Date of Patent: Aug. 24, 2010

(54) MULTIPOWER VOLTAGE REGULATOR

(75) Inventor: German Holguin, Orchard Park, NY (US)

(73) Assignee: Prestolite Electric, Inc., Ann Arbor, MI (US)

( * ) Notice: Subject to any disclaimer, the term of this patent is extended or adjusted under 35 U.S.C. 154(b) by 797 days.

(21) Appl. No.: 11/607,252

(22) Filed: Nov. 30, 2006

(65) Prior Publication Data

US 2008/0129255 A1 Jun. 5, 2008

(51) Int. Cl.
 H02J 7/16 (2006.01)
 H02P 9/30 (2006.01)
(52) U.S. Cl. .............................. 322/28; 322/37; 307/57
(58) Field of Classification Search ...................... 322/7, 322/22, 27, 28, 37, 59, 89, 99; 307/84, 57
See application file for complete search history.

(56) References Cited

U.S. PATENT DOCUMENTS

| | | | | |
|---|---|---|---|---|
| 3,679,964 | A | | 7/1972 | Nowell |
| 3,809,996 | A | * | 5/1974 | Meisenheimer ............... 322/28 |
| 4,539,515 | A | * | 9/1985 | Morishita et al. ........... 320/123 |
| 4,604,565 | A | * | 8/1986 | Yokota et al. ............... 320/123 |
| 4,631,474 | A | | 12/1986 | Dolland |
| 5,233,229 | A | * | 8/1993 | Kohl et al. ................. 307/10.1 |
| 5,254,936 | A | * | 10/1993 | Leaf et al. ..................... 322/90 |
| 5,642,033 | A | * | 6/1997 | Bartol et al. ................... 322/25 |
| 5,723,972 | A | * | 3/1998 | Bartol et al. ................... 322/15 |
| 5,739,676 | A | * | 4/1998 | Judge et al. ................... 322/22 |
| 5,744,941 | A | * | 4/1998 | Bartol et al. ................... 322/28 |
| 6,369,549 | B1 | * | 4/2002 | Brefeld et al. ................. 322/11 |
| 6,639,777 | B1 | | 10/2003 | Congdon |
| 6,677,739 | B1 | | 1/2004 | Bartol et al. |
| 6,803,748 | B2 | | 10/2004 | Peter |
| 7,019,495 | B2 | * | 3/2006 | Patterson ........................ 322/7 |
| 7,301,313 | B1 | * | 11/2007 | Hart et al. ................... 323/269 |
| 7,335,998 | B2 | * | 2/2008 | Wolf ............................. 290/10 |
| 7,365,519 | B2 | * | 4/2008 | Gibbs et al. ................... 322/28 |
| 2005/0046396 | A1 | | 3/2005 | Patterson |
| 2009/0243559 | A1 | * | 10/2009 | Bartol et al. ................... 322/15 |

* cited by examiner

Primary Examiner—Nicholas Ponomarenko
(74) Attorney, Agent, or Firm—McAndrews, Held & Malloy, Ltd.

(57) ABSTRACT

Certain embodiments of the present technology provide voltage regulator-alternator configurations that can distribute loads among a plurality of alternators, and fail-safe mechanisms used in connection with such voltage regulator-alternator configurations. For example, certain embodiments of the present technology provide electrical systems that include voltage regulators with connections over which control signals, which indicate whether a detected voltage is higher or lower than a target voltage, can be transmitted to other voltage regulators and received from other voltage regulators. For example, certain embodiments of the present technology provide voltage regulators that include connections over which control signals can be transmitted to other voltage regulators and received from other voltage regulators. For example, certain embodiments of the present technology provide methods of modifying a basic voltage regulator such that the modified voltage regulator can transmit a control signal to another voltage regulator and receive a control signal from another voltage regulator.

21 Claims, 12 Drawing Sheets

MULTIPOWER VOLTAGE REGULATOR

BACKGROUND OF THE INVENTION

Embodiments of the present technology generally relate to voltage regulator-alternator configurations. More particularly, embodiments of the present technology relate to voltage regulator-alternator configurations that distribute loads among a plurality of alternators, and fail-safe mechanisms used in connection with such voltage regulator-alternator configurations.

An alternator is an electromechanical device that converts mechanical energy to electrical energy. Alternators are used, for example, to convert mechanical energy supplied from the engine of an automobile to electrical energy. The electrical energy that is created can then be stored in a battery and/or consumed. Alternators can be used to convert mechanical energy supplied from other sources to electrical energy.

A voltage regulator is an electrical regulator that controls the voltage generated by an alternator. In general, a voltage regulator detects the voltage output by an alternator and comprises that voltage to a reference voltage. If the voltage being output by the alternator is higher than the reference voltage, the voltage regulator can instruct the alternator to reduce its voltage output. Likewise, if the voltage being output by the alternator is lower than the reference voltage, the voltage regulator can instruct the alternator to increase its voltage output.

In some systems, more electrical energy is required than can be converted/supplied, or than is desirable to convert/supply, using a single alternator. Such systems can utilize a plurality of alternators to convert/supply electrical energy. Also, systems that utilize a plurality of alternators can also utilize a plurality of voltage regulators.

In systems that utilize a plurality of alternators, various voltage regulator-alternator configurations have been used to control the voltage generated by the alternators. With regard to such systems, it is recognized that it is preferable to distribute the load among alternators such that no single alternator is supplying too much or too little of the required electrical energy.

However, as described in the Background Of The Invention section of U.S. Pat. No. 5,723,972 entitled Fail-Safe Common Control Of Multiple Alternators Electrically Connected In Tandem Parallel For Producing High Current, which issued on Mar. 3, 1998, the voltage regulator-alternator configurations known in the art have drawbacks.

Further, there are also drawbacks regarding the voltage regulator-alternator configuration described in the Abstract of U.S. Pat. No. 5,723,972 as: "One electronic voltage regulator that is modified to become a designated master produces a 'universal' control signal in response to variations in a voltage across the battery/load. This 'universal' control signal is further used in the master electronic voltage regulator itself to develop a conventional signal providing regulation to an associated alternator. The same universal control signal is provided by wired connection to all remaining, preferably identical, voltage regulators, each of which is modified to become a follower voltage regulator. Each of the follower voltage regulators produces a signal for the regulation control of its associated alternator not by reference to the battery/load voltage (as would be normal), but rather by reference to the universal control signal."

One drawback of the voltage regulator-alternator configuration described in U.S. Pat. No. 5,723,972, is that the system requires one "master" voltage regulator used in connection with "follower" voltage regulators. In the system, the "master" voltage regulator is the only control device and, thus, if the master voltage regulator fails, the entire electrical system can shut down or try to run away, which means that the electrical system could continue to create electrical energy without being regulated, for example, by a voltage regulator. Further, "master" voltage regulators and "follower" voltage regulators are distinct in design and function and, thus, "master" voltage regulators and "follower" voltage regulators are not interchangeable, which can decrease convenience.

Thus, there is a need for new voltage regulator-alternator configurations that distribute loads among a plurality of alternators without relying on a single control device, and without multiple voltage regulators that are distinct in design and function. Further, as with any electrical system, in order to prevent damage and/or undesirable conditions, there is a need for fail-safe mechanisms to be used in connection with new voltage regulator-alternator configurations.

BRIEF SUMMARY OF THE INVENTION

Certain embodiments of the present technology provide an electrical system comprising a plurality of alternator-voltage regulator pairs connected in parallel for providing electric power, wherein a first voltage regulator is configured to transmit a control signal to a second voltage regulator and receive a control signal from the second voltage regulator, and wherein control signals indicate whether the voltage output of the plurality of alternator-voltage regulator pairs is above or below a target voltage. For example, in certain embodiments, each voltage regulator is configured to increase voltage output of its corresponding alternator when any control signal indicates that the voltage output of the plurality of alternator-voltage regulator pairs is lower than a target voltage. For example, in certain embodiments, each voltage regulator is configured to decrease voltage output of its corresponding alternator when all control signals indicate that the voltage output of the plurality of alternator-voltage regulator pairs is higher than a target voltage.

Certain embodiments of the present technology provide a voltage regulator comprising a connection over which a control signal can be transmitted from the voltage regulator to a second voltage regulator, and over which a control signal can be received from the second voltage regulator, wherein control signals indicate whether a detected voltage is higher than a target voltage or lower than the target voltage. For example, in certain embodiments, a voltage regulator further comprises a voltage detector and error amplifier configured to (i) detect a voltage, (ii) compare the detected voltage to the target voltage, and (iii) transmit a control signal that indicates whether the detected voltage is higher than the target voltage or lower than the target voltage, and an electronic switch configured to (i) receive a control signal, (ii) excite the field of a corresponding alternator when the control signal indicates that the detected voltage is lower than the target voltage, and (iii) de-excite the field of the corresponding alternator when the control signal indicates that the detected voltage is higher than the target voltage.

Certain embodiments of the present technology provide a voltage regulator that includes a fail-safe mechanism configured to detect a high voltage condition and disable the electronic switch of the voltage regulator for a certain period of time when the high voltage condition is detected.

Certain embodiments of the present technology provide a voltage regulator that includes a fail-safe mechanism configured to detect a high current condition and disable the electronic switch of the voltage regulator for a certain period of time when the high current condition is detected.

Certain embodiments of the present technology provide a method of modifying a voltage regulator comprising providing a basic voltage regulator with an electronic switch, and modifying the provided voltage regulator such that the voltage regulator can transmit a control signal to a second voltage regulator and receive a control signal from the second voltage regulator, wherein control signals indicate whether a detected voltage is higher than a target voltage or lower than the target voltage.

Figure 1:
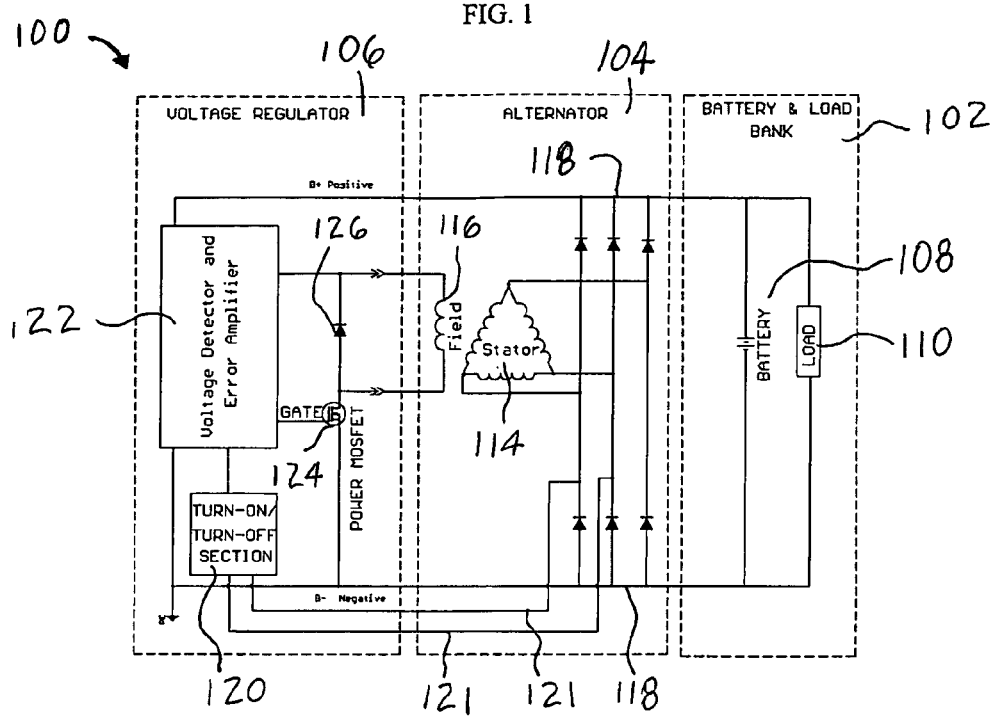
FIG. 1 illustrates a schematic diagram of an electrical system with a voltage regulator-alternator configuration that includes a basic voltage regulator with a low-side switch.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EMBODIMENTS

FIG. 1 illustrates a schematic diagram of an electrical system 100 with a voltage regulator-alternator configuration that includes a basic voltage regulator 106 with a low-side switch 124. The electrical system 100 shown in FIG. 1 includes: a battery and load bank 102, an alternator 104 and a basic voltage regulator 106. In the electrical system 100 shown in FIG. 1, the alternator 104 converts mechanical energy to electrical energy. The amount of electrical energy that is output by the alternator 104 is regulated by the voltage regulator 106. The electrical energy that is created by the alternator 104 is stored and/or consumed at the battery and load bank 102.

The battery and load bank 102 shown in FIG. 1 includes a battery 108, which is an electrical power source and/or consumer (depending on the operating conditions), and a load 110, which is an electrical power consumer. In certain systems, the battery 108 can be a vehicle battery, for example, a car, bus, ambulance or truck battery. In other systems, the battery 108 can be a different type of battery. In certain systems, the load 110 can be the power consumption of a vehicle, for example, the power required to run lights, air conditioning, radio, and/or the vehicle itself, etc. In certain systems, the load 110 can be the power consumption of something else that consumes power.

The alternator 104 shown in FIG. 1 includes: a stator 114, a field 116 and output terminals 118. The field 116 is mechanically driven and rotates in relation to the stator 114. The electrical energy created by the alternator 104 depends in part on: (1) the amount of mechanical energy input into the alternator 104, which is related to the speed that the field 116 rotates in relation to the stator 114; and (2) the excitation level of the field 116. For example, when excitation level in the field 116 is fixed, the amount of electrical energy created by the alternator 104 can vary with rotation speed of the field 116. Likewise, when rotation speed of the field 116 is fixed, the amount of electrical energy created by the alternator 104 can vary with the excitation level in the field 116. That is, at a higher excitation level, more electrical energy will be created by the alternator 104 than at a lower excitation level. The output terminals 118 output electrical energy to the battery and load bank 102.

The voltage regulator 106 shown in FIG. 1 includes: a turn-on/turn-off section 120; a voltage detector and error amplifier 122; a switch 124; and a diode 126. The turn-on/turn-off section 120 shown in FIG. 1 can enable or disable the voltage regulator 106 based on whether the alternator 104 is being supplied with mechanical energy or not. For example, in certain embodiments, if the alternator 104 is running (that is, the field 116 is rotating) the turn-on/turn-off section 120 can enable the voltage regulator 106, and if the alternator 104 is not running, the turn-on/turn-off section 120 can disable the voltage regulator 106. In certain systems, the turn-on/turn-off section 120 can enable or disable the functioning of the voltage regulator 106 in response to either a direct current (DC) signal and/or an Alternating Current (AC) signal. For example, in certain systems, a DC signal is provided by means of an ignition switch, in which case the regulator is known as ignition excite. For example, in certain systems, an AC signal is provided by one or two phase connections from the alternator, in which case the regulator is known as self-excite. In the system shown in FIG. 1, the turn-on/turn-off section 120 is responsive to two phase connections 121 from the alternator 104, which configuration corresponds to a self excite voltage regulator.

The voltage detector and error amplifier 122 shown in FIG. 1 can detect the voltage being output by the alternator 104, and compare that voltage with a target voltage. Then, depending on the difference between the detected voltage and the target voltage, the voltage detector and error amplifier 122 can cause the alternator 104 to increase or decrease voltage output by sending a control signal to the switch 124. For example, in certain systems, the voltage detector and error amplifier 122 can send a square wave signal with a variable duty cycle to the switch 124. The square wave signal will have a high voltage output, compared to B−, when the sensed voltage at the output of the alternator is low compared to its internal reference and the square wave signal will have a low voltage when the sensed voltage at the output of the alternator is high compared to its internal reference.

In embodiments that use a Frequency On Demand (FOD) voltage regulator, the voltage detector and error amplifier 122 can cause the alternator 104 to increase or decrease voltage output by sending a square wave signal with a variable frequency and a variable duty cycle, for example. In embodiments that use a Pulse Width Modulation (PWM) voltage regulator, the voltage detector and error amplifier 122 can cause the alternator 104 to increase or decrease voltage output by sending square wave signal with a fixed frequency and a variable duty cycle, for example. For either FOD or PWM, the square signal duty cycle can vary from 0% to 100%.

The switch 124 shown in FIG. 1 is an electronic switching device that can be used in connection with the voltage detector and error amplifier 122 to control the voltage output of the alternator 104. That is, when the voltage detector and error amplifier 122 signals that the voltage output of the alternator 104 is too low (meaning that the output of the voltage detector and error amplifier is high), the switch 124 can excite the field 116, thereby increasing the electrical energy output by the alternator 104. Likewise, when the voltage detector and error amplifier 122 signals that the voltage output of the alternator 104 is too high (meaning that the output of the voltage detector and error amplifier is high), the switch 124 can de-excite the field 116, thereby decreasing the electrical energy output by the alternator 104. As shown in FIG. 1, the switch 124 can be a power MOSFET. The diode 126 can discharge stored energy from the field 116, thereby eliminating any corresponding inductive voltage.

Figure 2:
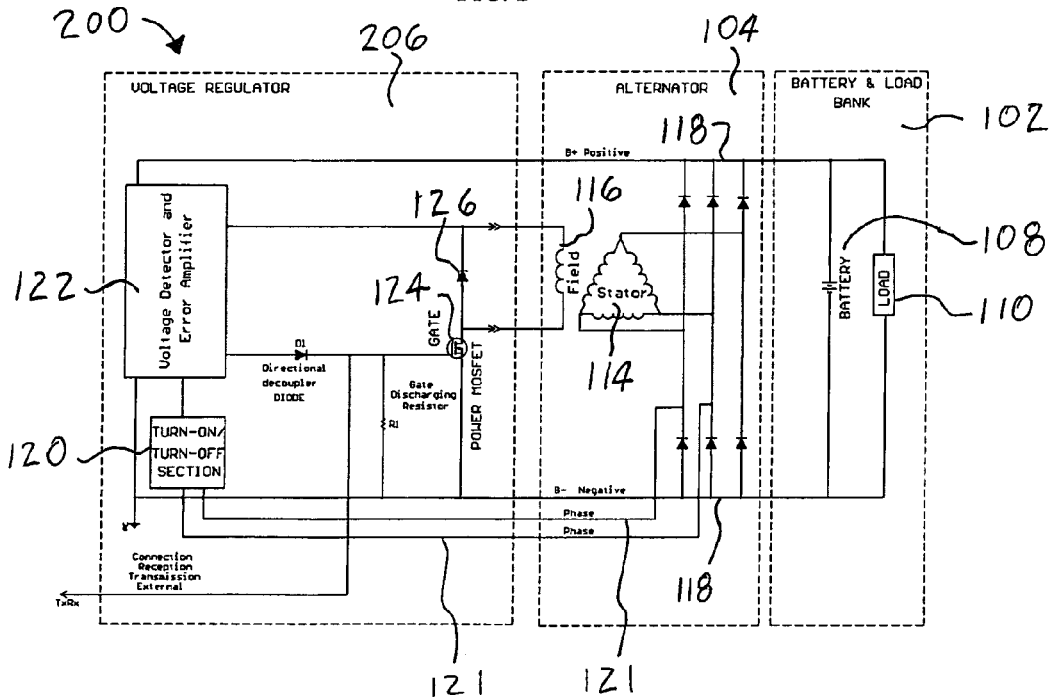
FIG. 2 illustrates a schematic diagram of an electrical system with a voltage regulator-alternator configuration that includes a voltage regulator with a low-side switch used in accordance with an embodiment of the present technology.

FIG. 2 illustrates a schematic diagram of an electrical system 200 with a voltage regulator-alternator configuration that includes a voltage regulator 206 with a low-side switch used in accordance with an embodiment of the present technology. The system 200 includes elements that are the same as elements shown and described in connection with FIG. 1. Elements shown in FIG. 2 that are the same as elements shown and described in connection with FIG. 1 are identified with the same numbers used in connection with FIG. 1, and can have embodiments (shown and alternative) that are similar to those described in connection with FIG. 1, for example.

In addition to elements shown and described in connection with FIG. 1, the system 200 also includes: a diode D1, a resistor R1 and a connection TxRx. The diode D1 is a directional high-impedance de-coupler that can be located between the output of the voltage detector and error amplifier 122 and the switch 124. In the embodiment shown in FIG. 2, the switch 124 is a power MOSFET and diode D1 is located between the output of the voltage detector and error amplifier 122 and the gate terminal of the power MOSFET.

In the embodiment shown in FIG. 2, the resistor R1 is located between the gate and source terminals of the power MOSFET. The resistor R1 is added because the diode D1 is blocking the discharge path from the gate of the power MOSFET. The resistor R1 provides a means to discharge the gate of the power MOSFET. For example, the resistor R1 can be used to discharge the gate of power MOSFET when there is no high voltage applied to the gate of the power MOSFET, that is, when the voltage detector and error amplifier 122 signals that the voltage output of the alternator 104 is too high, and the power MOSFET de-excites the field 116, thereby decreasing the electrical energy output by the alternator 104.

In the embodiment shown in FIG. 2, the connection TxRx provides a connection from the node formed by the cathode of the diode D1 and the gate of the power MOSFET to a connecting point. The connection TxRx can be used to transmit a control signal from the voltage detector and error amplifier 122 to another voltage regulator that is similarly configured. The connection TxRx can be used to receive a control signal from another voltage regulator that is similarly configured. In certain embodiments, the connection TxRx can be a bi-directional bus. In certain embodiments, the connection TxRx can be anything that allows a control signal to be transmitted and received between voltage regulators.

A voltage regulator that is configured as shown and described in connection with FIG. 2 can be referred to as a "Multipower Voltage Regulator."

A voltage regulator that is configured as shown and described in connection with FIG. 2 can be used in connection with an electrical system that only includes one alternator and one voltage regulator. In such an embodiment, the connection TxRx is not connected to another voltage regulator and, thus, cannot receive a control signal from another voltage regulator. In such an embodiment, when the connection TxRx is not connected to another voltage regulator, the voltage regulator will function as a basic voltage regulator, such as the voltage regulator shown and described in connection with FIG. 1, for example.

Figure 3:
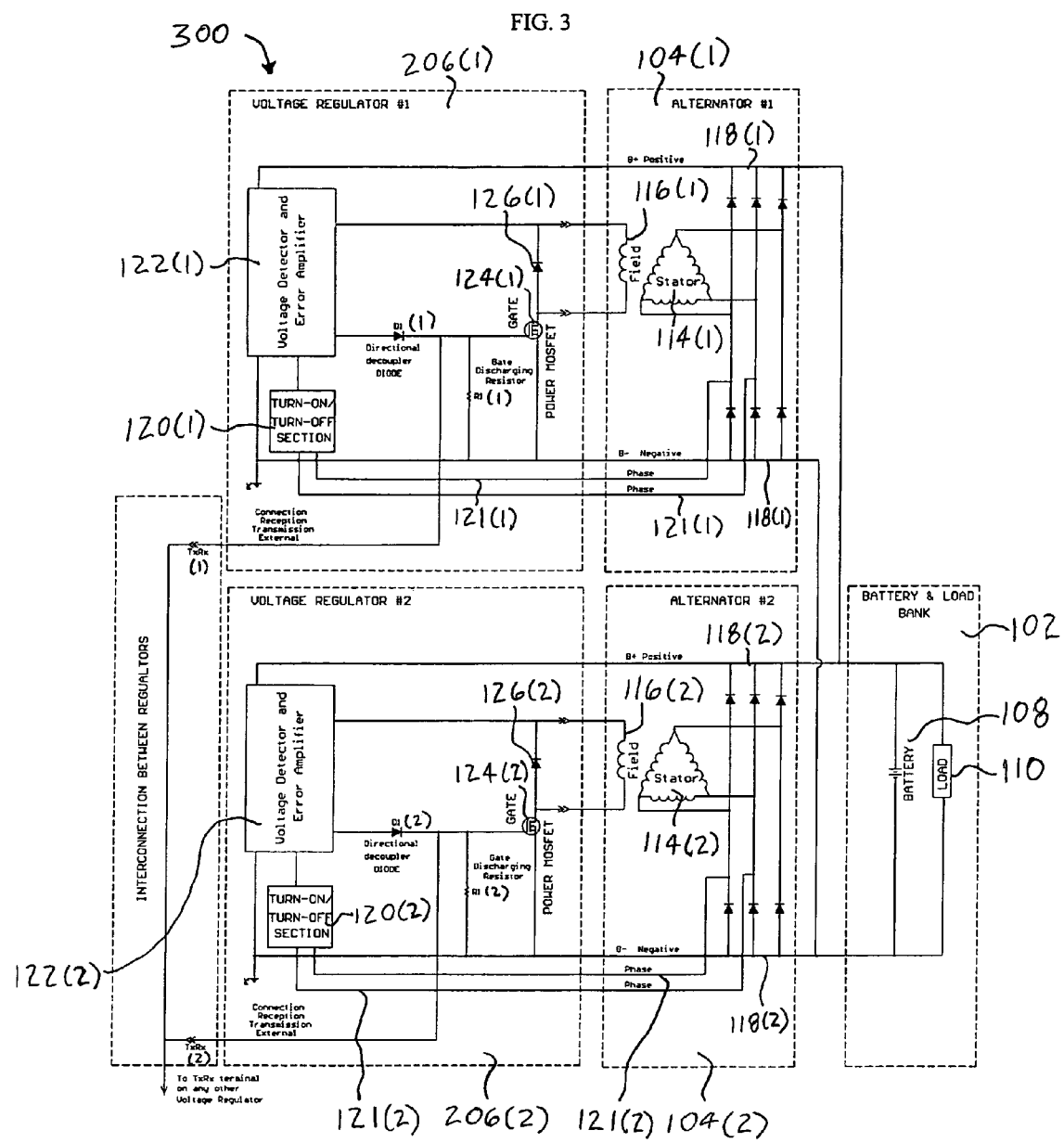
FIG. 3 illustrates a schematic diagram of an electrical system with a voltage regulator-alternator configuration used in accordance with an embodiment of the present technology.

FIG. 3 illustrates a schematic diagram of an electrical system 300 with a voltage regulator-alternator configuration used in accordance with an embodiment of the present technology. The system 300 includes elements that are the same as elements shown and described in connection with FIGS. 1 and 2. Elements shown in FIG. 3 that are the same as elements shown and described in connection with FIGS. 1 and 2 are identified with the same numbers used in connection with FIGS. 1 and 2, and can have embodiments (shown and alternative) that are similar to those described in connection with FIGS. 1 and 2, for example.

FIG. 3 illustrates an electrical system 300 with two alternators 104(1), 104(2) connected in parallel and providing electrical energy to a single battery and load bank 102. Each alternator 104(1), 104(2) has an associated voltage regulator 206(1), 206(2). The voltage regulators 206(1), 206(2) are connected by connections TxRx(1), TxRx(2).

In operation, each voltage detector and error amplifier 122(1), 122(2) can generate a control signal based on the output voltage across B+ and B− of the whole electrical system. That is, because the alternators 104(1), 104(2) are on a parallel connection, the voltage detected by both voltage detector and error amplifiers 122(1), 122(2) is basically the same and corresponds to the voltage across B+ and B− of the whole electrical system. Thus, a voltage difference if any is only a function of the wiring voltage drop between each voltage detector and error amplifier 122(1), 122(2). The control signals can then be communicated to all connected voltage regulators 206(1), 206(2). If all control signals indicate that the voltage output of the system 300 is too high, all switches 124(1), 124(2) can de-excite the corresponding fields 116(1), 116(2), thereby decreasing the electrical energy output by alternators 104(1), 104(2). If any control signal indicates that the voltage output of the system 300 is too low, all switches 124(1), 124(2) can excite fields 116(1), 116(2), thereby increasing the electrical energy output by all alternators 104(1), 104(2).

In certain embodiments, any number of alternator and voltage regulator pairs can be connected in parallel to provide electrical energy. In certain embodiments, any number of voltage regulators can be connected by TxRx connections in a star or daisy chain configuration to provide control by communicating control signals. In certain embodiments, the number of alternator and voltage regulator pairs can vary depending on the amount of electrical energy that is to be generated. In certain embodiments, the number of alternator and voltage regulator pairs can vary depending on the mechanical requirements and limitations to drive the multiplicity of alternator and voltage regulator pairs. In certain embodiments, the configuration of alternator and voltage regulator pairs can vary depending on system requirements and/or design preferences.

Figure 4:
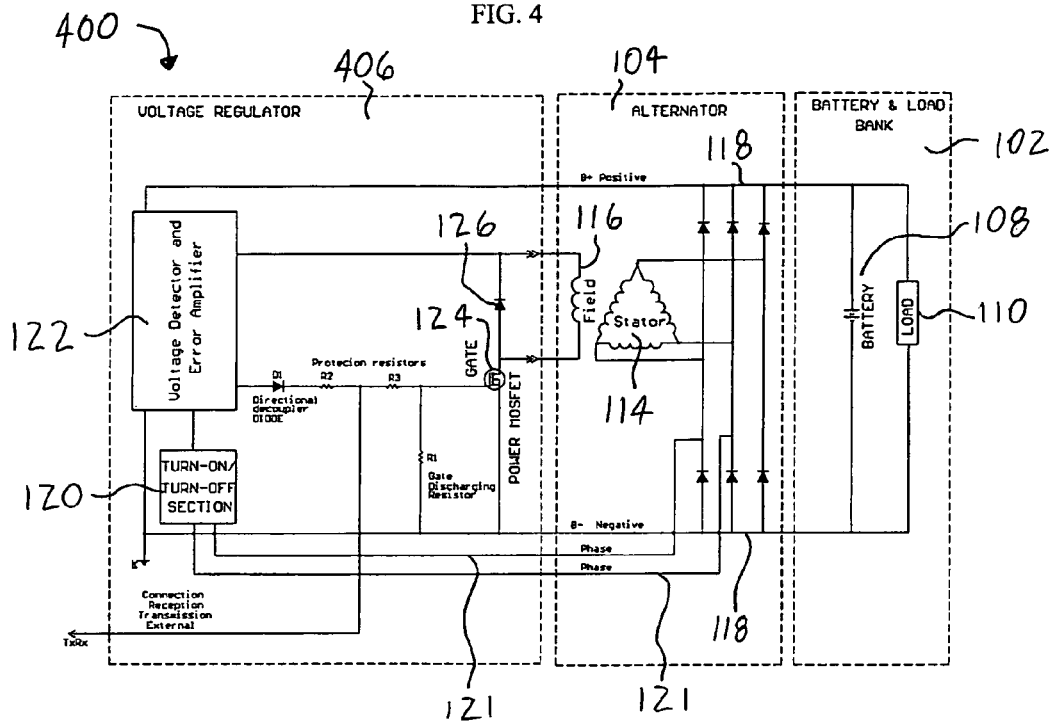
FIG. 4 illustrates a schematic diagram of an electrical system with a voltage regulator-alternator configuration that includes a voltage regulator with fail-safe mechanism used in accordance with an embodiment of the present technology.

FIG. 4 illustrates a schematic diagram of an electrical system 400 with a voltage regulator-alternator configuration that includes a voltage regulator 406 with a fail-safe mechanism used in accordance with an embodiment of the present technology. The system 400 includes elements that are the same as elements shown and described in connection with FIGS. 1-3. Elements shown in FIG. 4 that are the same as elements shown and described in connection with FIGS. 1-3 are identified with the same numbers used in connection with FIGS. 1-3, and can have embodiments (shown and alternative) that are similar to those described in connection with FIGS. 1-3, for example.

In addition to elements shown and described in connection with FIGS. 1-3, the system 400 also includes a fail-safe mechanism comprising two resistors R2, R3. Fail-safe mechanisms can prevent damage and/or undesirable conditions that result from abnormal connections, for example. In the embodiment shown in FIG. 4, the resistors R2, R3 can disable the system 400 without damaging the voltage detector and error amplifier 122 when the connection TxRx is shorted to the ground (B−).

Figure 5:
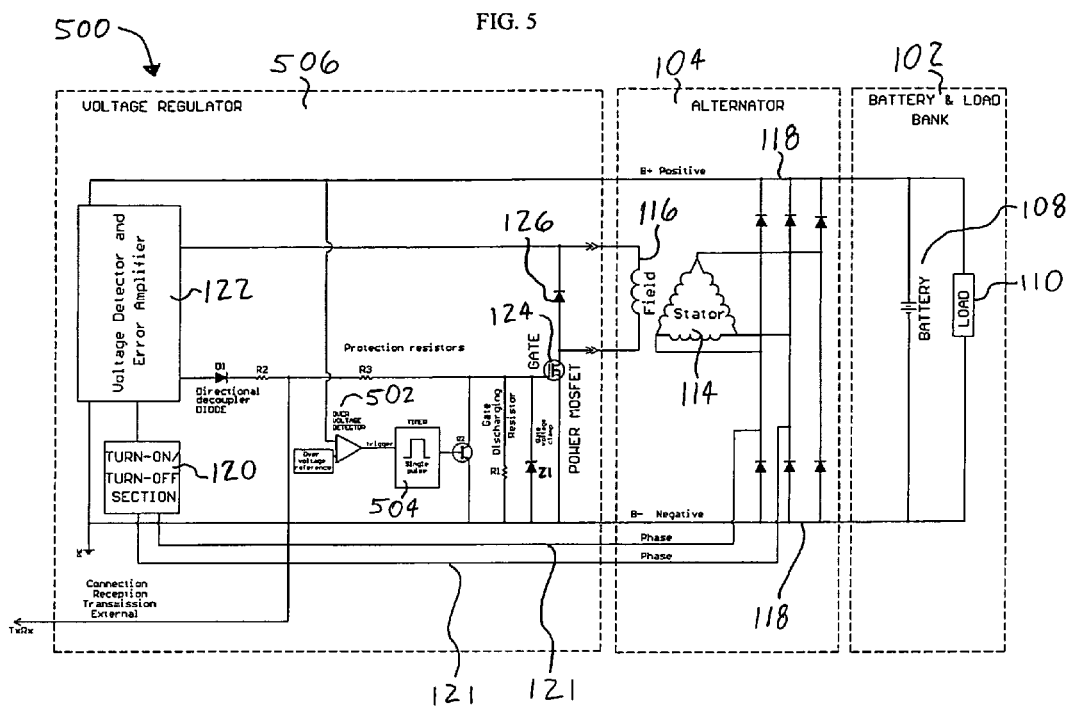
FIG. 5 illustrates a schematic diagram of an electrical system with a voltage regulator-alternator configuration that includes a voltage regulator with fail-safe mechanism used in accordance with an embodiment of the present technology.

FIG. 5 illustrates a schematic diagram of an electrical system 500 with a voltage regulator-alternator configuration that includes a voltage regulator 506 with a fail-safe mechanism used in accordance with an embodiment of the present technology. The system 500 includes elements that are the same as elements shown and described in connection with FIGS. 1-4. Elements shown in FIG. 5 that are the same as elements shown and described in connection with FIGS. 1-4 are identified with the same numbers used in connection with FIGS. 1-4, and can have embodiments (shown and alternative) that are similar to those described in connection with FIGS. 1-4, for example.

In addition to elements shown and described in connection with FIGS. 1-4 the system 500 also includes a fail-safe mechanism comprising an over voltage detector 502, a timer 504, a diode Z1 and a cut-off drive Q2. In the embodiment shown in FIG. 5, the over voltage detector 502, the timer 504, the diode Z1 and the cut-off drive Q2 can be used to avoid a runaway condition resulting from a short circuit between the connection TxRx and B+. A runaway condition occurs when an electrical system functions without being regulated, for example, by a voltage regulator. That is, a short circuit between the connection TxRx and B+ can cause the switch 124 to excite the field 116 without control, thereby creating a high voltage condition. The over voltage detector 502 can detect a high voltage condition. When a high voltage condition is detected, the over voltage detector 502 can signal the timer 504, which can be a mono-stable multivibrator, for example. During this signaling, the timer 504 can signal the cut-off drive Q2 to stop any high voltage from reaching the gate of the switch 124, thereby disabling the switch 124, so that the switch 124 does not excite the field 116 for a period of time. After the period of time has expired, the switch 124 can be enabled. If a high voltage condition still exists, the over voltage detector 502 can detect the high voltage condition and signal the timer 504. If no high voltage condition exists, the over voltage detector 502 will not detect a high voltage condition and will not signal the timer 504.

In the embodiment shown in FIG. 5, the fail-safe mechanism also includes a diode Z1. In the embodiment shown in FIG. 5, the diode Z1 is a voltage limiter clamping device (zener diode) and is located across the gate-source junction of the power MOSFET. The diode Z1 can clamp the gate voltage below a damaging level, which level can be specified by the MOSFET manufacturer. In certain embodiments, a diode can be part of a basic voltage regulator and can be located inside a voltage detector and error amplifier. In such embodiments, the diode can be directly attached to the gate of the power MOSFET.

Figure 6:
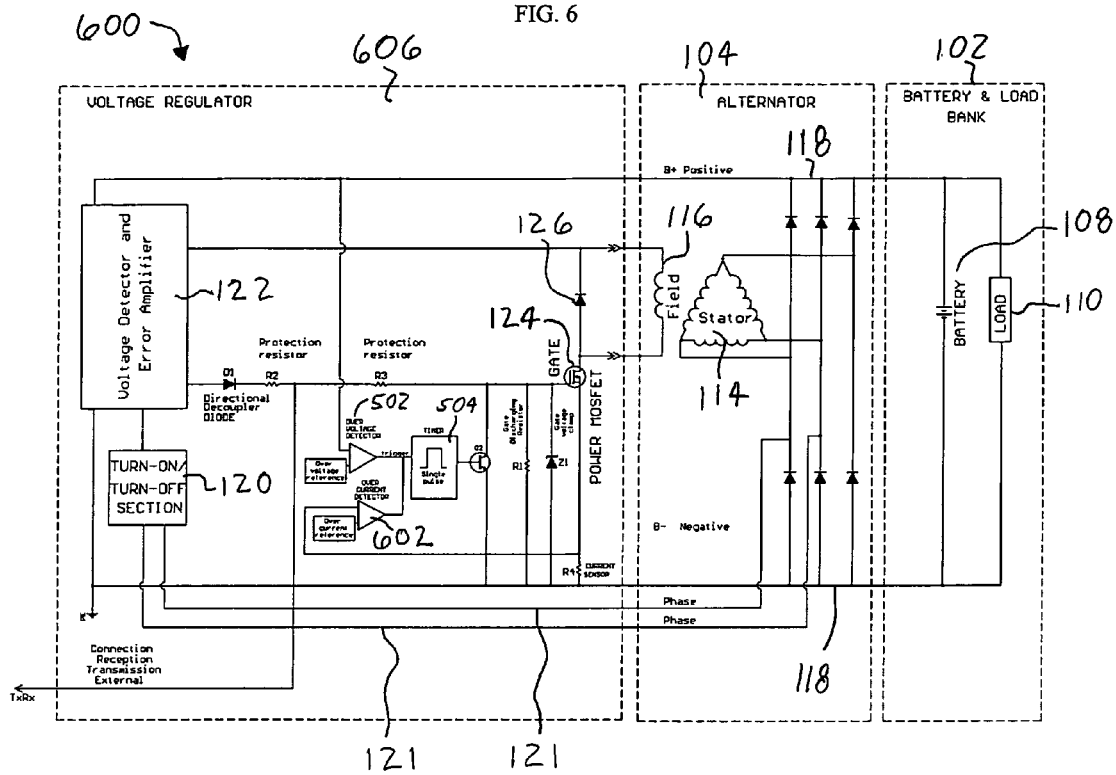
FIG. 6 illustrates a schematic diagram of an electrical system with a voltage regulator-alternator configuration that includes a voltage regulator with fail-safe mechanism used in accordance with an embodiment of the present technology.

FIG. 6 illustrates a schematic diagram of an electrical system 600 with a voltage regulator-alternator configuration that includes a voltage regulator 606 with a fail-safe mechanism used in accordance with an embodiment of the present technology. The system 600 includes elements that are the same as elements shown and described in connection with FIGS. 1-5. Elements shown in FIG. 6 that are the same as elements shown and described in connection with FIGS. 1-5 are identified with the same numbers used in connection with FIGS. 1-5, and can have embodiments (shown and alternative) that are similar to those described in connection with FIGS. 1-5, for example.

In addition to elements shown and described in connection with FIGS. 1-5 the system 600 also includes a fail-safe mechanism comprising an over current detector 602 and a resistor R4. The over current detector 602 can disable the switch 124, such that the switch 124 does not excite the field 116, when a short circuit occurs across the field 116. That is, a short circuit across the field 116 can damage the switch 124 by allowing the switch 124 to remain in the on position, thereby exciting the field 116, without current limitation. Many basic voltage regulators are protected against this condition. The addition of the diode D1 combined with a control signal over the connection TxRx that indicates that the switch 124 should excite the field 116, may, however, effectively disable existing protection.

In the embodiment shown in FIG. 6, the resistor R4 can be located within the drain-source path of the switch 124, thereby sensing the current level across the switch 124. In certain embodiments, the resistor R4 can be located within the path source ground of the switch 124, thereby sensing the current level across the switch 124, for example. The over current detector 602 can detect a high current condition. When a high current condition is detected, the over current detector 602 can signal the timer 504. During this signaling, the timer 504 can disable the switch 124, so that the switch 124 does not attempt to excite the field 116, for a period of time. After the period of time has expired, the switch 124 can be enabled. If a high current condition still exists, the over current detector 602 can detect the high current condition and signal the timer 504. If no high current condition exists, the over current detector 602 will not detect a high current condition and will not signal the timer 504.

In the embodiment shown in FIG. 6, the system 600 includes an over voltage detector 502 and an over current detector 602, both of which are connected to the timer 504. Thus, the system 600 has fail-safe mechanisms in place to protect against both a high-voltage condition and a high-current condition.

Figure 7:
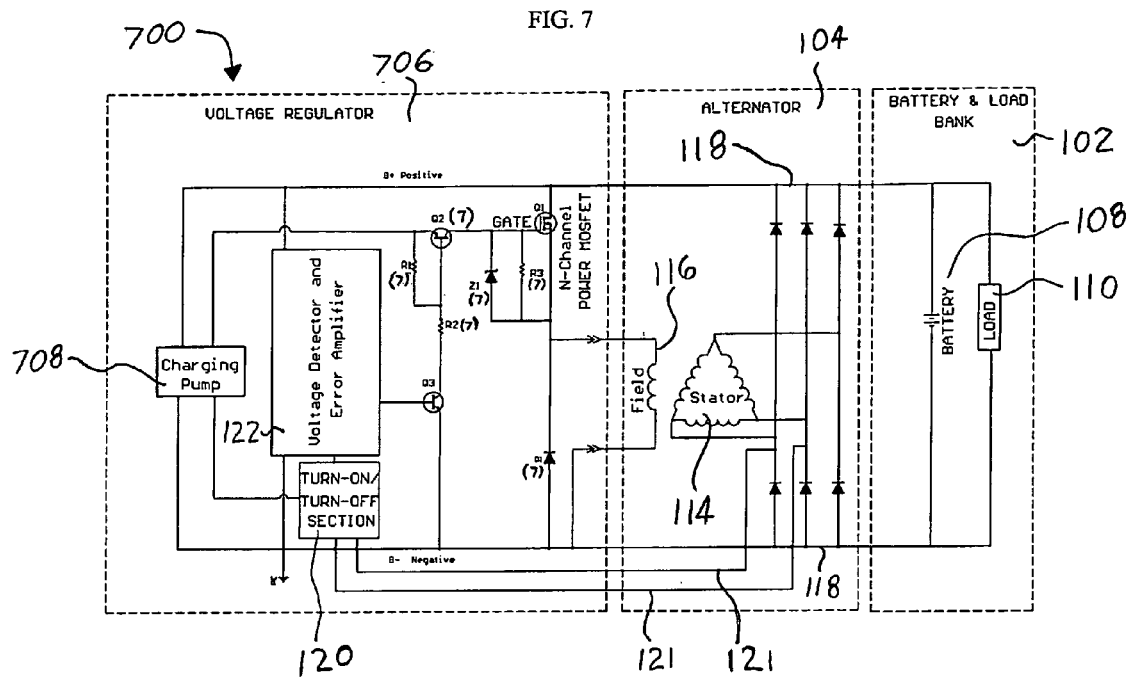
FIG. 7 illustrates a schematic diagram of an electrical system with a voltage regulator-alternator configuration that includes a basic voltage regulator with a high-side switch.

FIG. 7 illustrates a schematic diagram of an electrical system 700 with a voltage regulator-alternator configuration that includes a basic voltage regulator 706 with a high-side switch Q1. The system 700 includes elements that are the same as elements shown and described in connection with FIG. 1. Elements shown in FIG. 7 that are the same as elements shown and described in connection with FIG. 1 are identified with the same numbers used in connection with FIG. 1, and can have embodiments (shown and alternative) that are similar to those described in connection with FIG. 1, for example.

In addition to certain elements shown and described in connection with FIG. 1, the system 700 also includes: a high-side switch Q1, cut-off drives Q2(7) and Q3, a charging pump 708, diodes D1(7) and Z1(7), and resistors R1(7), R2(7) and R3(7). In the embodiment shown in FIG. 7, the high side switch Q1 is an N-Channel power MOSFET that is located between B+ (positive) and an end of the field 116. In the embodiment shown in FIG. 7, the other end of the field is attached to B− (negative). In the embodiment shown in FIG. 7, D1(7) is a fly-wheel diode located across the field 116.

In the embodiment shown in FIG. 7, the charging pump 708 provides voltage to the gate of the switch Q1. That is, the charging pump 708 receives the B+ voltage and boosts the voltage to a voltage greater than the B+ voltage to provide a biasing voltage to the gate of the switch Q1, which is an N-Channel MOSFET. In the embodiment shown in FIG. 7, in order to turn-on the N-Channel MOSFET Q1 the gate voltage must be greater than a certain level known as the "threshold voltage." In certain embodiments, the threshold voltage is greater than 4V. Because the "source" terminal of the MOSFET is basically at B+ potential when the MOSFET is "on," a voltage greater than B+ is required.

In the embodiment shown in FIG. 7, the voltage detector and error amplifier 122 can control the switch Q1 by enabling or disabling cut-off drives Q2(7) and Q3. That is, the voltage detector and error amplifier 122 can generate a high or low voltage level output based on the voltage detected across B+ (positive) and B− (negative), which voltage corresponds to the voltage output of the alternator 104. For example, when the voltage detected across B+ (positive) and B− (negative) is lower than the voltage detector and error amplifier's internal reference, the voltage detector and error amplifier 122 can generate a high voltage level. When the voltage detector and error amplifier 122 generates a high voltage, cut-off drives Q2(7) and Q3 can be enabled (turned on). When cut-off drive Q2(7) is enabled, the increased voltage created by the charging pump 708 can be applied to the gate of the switch Q1, thereby causing the switch Q1 to excite the field 116, and increasing the electrical energy output by the alternator 104. For example, when the voltage detected across B+ (positive) and B− (negative) is higher than the voltage detector and error amplifier's internal reference, the voltage detector and error amplifier 122 can generate a low voltage level. When the voltage detector and error amplifier 122 generates a low voltage, cut-off drives Q2(7) and Q3 can be disabled (turned off). When cut-off drive Q2(7) is disabled, the increased voltage created by the charging pump 708 is not applied to the gate of the switch Q1. This condition, together with the discharging path provided by resistor R3(7) causes the switch Q1 to de-excite the field 116, thereby decreasing the electrical energy output by the alternator 104. In the embodiment shown in FIG. 7, diode Z1(7) is a zener diode, which provides a clamping voltage to protect the gate of the switch Q1.

In certain embodiments, the system 700 can be modified such that the charging pump is built into the high side switch. In certain embodiments, the system 700 can be modified to use a P-channel MOSFET as the high side switch. In embodiments that use a P-channel MOSFET as the high side switch, the switch is normally driven only by cut-off drive Q2(7) and resistor R2(7) and no charging pump is required.

Figure 8:
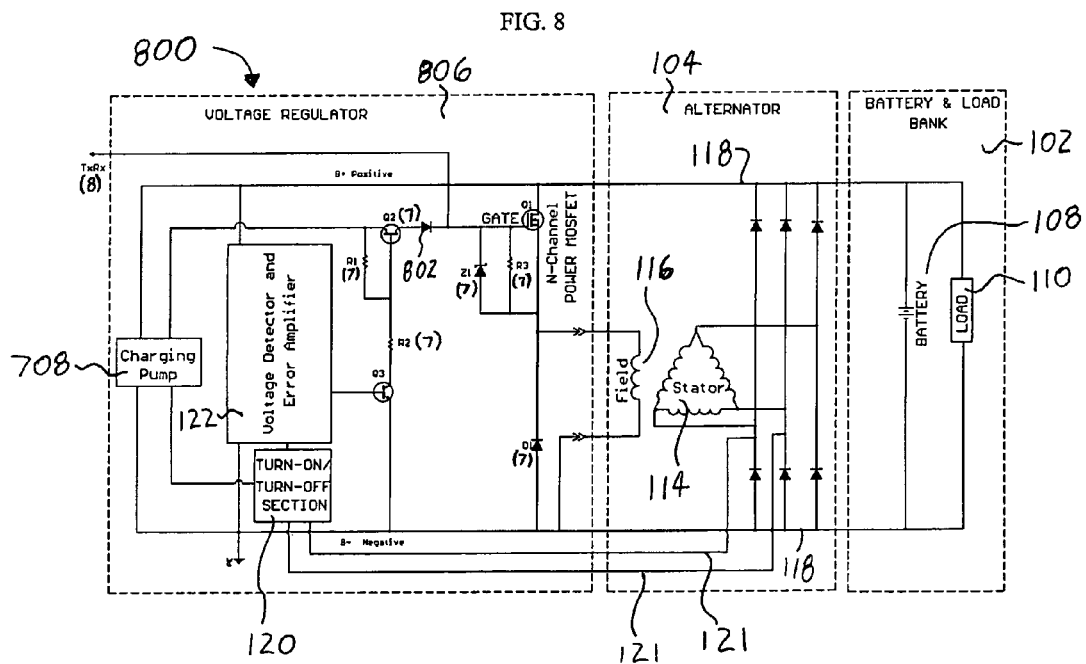
FIG. 8 illustrates a schematic diagram of an electrical system with a voltage regulator-alternator configuration that includes a voltage regulator with a high-side switch used in accordance with an embodiment of the present technology.

FIG. 8 illustrates a schematic diagram of an electrical system 800 with a voltage regulator-alternator configuration that includes a voltage regulator 806 with a high-side switch Q1 used in accordance with an embodiment of the present technology. The system 800 includes elements that are the same as elements shown and described in connection with FIGS. 1 and 7. Elements shown in FIG. 8 that are the same as elements shown and described in connection with FIGS. 1 and 7 are identified with the same numbers used in connection with FIGS. 1 and 7, and can have embodiments (shown and alternative) that are similar to those described in connection with FIGS. 1 and 7, for example.

In addition to certain elements shown and described in connection with FIGS. 1 and 7, the system 800 also includes diode 802 and connection TxRx(8). In the embodiment shown in FIG. 8, diode 802 is a directional high-impedence decoupler that is located between cut-off drive Q2(7) and the gate of switch Q1. In the embodiment shown in FIG. 8, the connection TxRx(8) provides a connection from the node formed by the cathode of the diode 802 and the gate of the switch Q1 to a connecting point. The connection TxRx(8) can be used to transmit a control signal from the voltage detector and error amplifier 122 to another voltage regulator that is similarly configured. The connection TxRx(8) can be used to receive a control signal from another voltage regulator that is similarly configured. In certain embodiments, the connection TxRx(8) can be a bi-directional bus. In certain embodiments, the connection TxRx(8) can be anything that allows a control signal to be transmitted and received between voltage regulators.

A voltage regulator that is configured as shown and described in connection with FIG. 8 can be referred to as a "Multipower Voltage Regulator."

A voltage regulator that is configured as shown and described in connection with FIG. 8 can be used in connection with an electrical system that only includes one alternator and one voltage regulator. In such an embodiment, the connection TxRx(8) is not connected to another voltage regulator and, thus, cannot receive a control signal from another voltage regulator. In such an embodiment, when the connection TxRx(8) is not connected to another voltage regulator, the voltage regulator will function as a basic voltage regulator, such as the voltage regulator shown and described in connection with FIG. 7, for example.

A voltage regulator that is configured as shown and described in connection with FIG. 8 is protected against a short between TxRx(8) and B− (ground) because when TxRx(8) is connected to B−, all high-side switches are disabled due to the voltage across the gate of the switch Q1 being negative and clamped to the voltage drop across zener diode Z1(7). A voltage regulator that is configured as shown and described in connection with FIG. 8 is protected against a short between TxRx(8) and B+ because when TxRx(8) is connected to B+, all high-side switches are disabled due to the voltage across the gate of the switch Q1 being zero.

Figure 9:
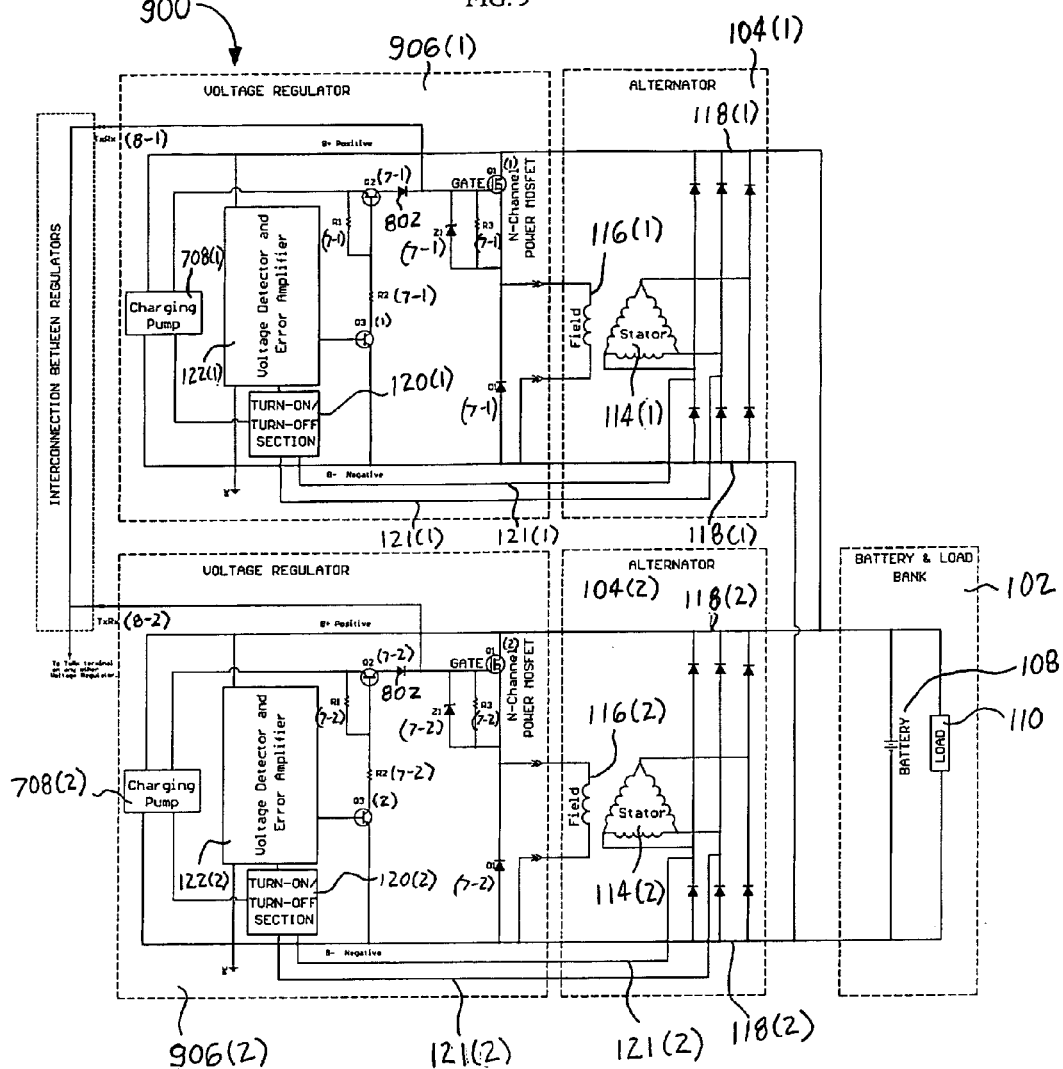
FIG. 9 illustrates a schematic diagram of an electrical system with a voltage regulator-alternator configuration used in accordance with an embodiment of the present technology.

FIG. 9 illustrates a schematic diagram of an electrical system 900 with a voltage regulator-alternator configuration used in accordance with an embodiment of the present technology. The system 900 includes elements that are the same as elements shown and described in connection with FIGS. 1, 7 and 8. Elements shown in FIG. 9 that are the same as elements shown and described in connection with FIGS. 1, 7 and 8 are identified with the same numbers used in connection with FIGS. 1, 7 and 8, and can have embodiments (shown and alternative) that are similar to those described in connection with FIGS. 1, 7 and 8, for example.

FIG. 9 illustrates an electrical system 900 with two alternators 104(1), 104(2) connected in parallel and providing electrical energy to a single battery and load bank 102. Each alternator 104(1), 104(2) has an associated voltage regulator 906(1), 906(2). The voltage regulators 906(1), 906(2) are connected by connections TxRx(8-1), TxRx(8-2).

In operation, each voltage detector and error amplifier 122(1), 122(2) can generate a control signal based on the output voltage across B+ and B− of the whole electrical system. That is, because the alternators 104(1), 104(2) are on a parallel connection, the voltage detected by both voltage detector and error amplifiers 122(1), 122(2) is basically the same and corresponds to the voltage across B+ and B− of the whole electrical system. Thus, a voltage difference if any is only a function of the wiring voltage drop between each voltage detector and error amplifier 122(1), 122(2). The control signals can then be communicated to all connected voltage regulators 906(1), 906(2). If all control signals indicate that the voltage output of the system 900 is too high, all switches Q1(1), Q1(2) can de-excite fields 116(1), 116(2), thereby decreasing the electrical energy output by alternators 104(1), 104(2). If any control signal indicates that the voltage output of the system 900 is too low, all switches Q1(1), Q1(2) can excite fields 116(1), 116(2), thereby increasing the electrical energy output by all alternators 104(1), 104(2).

In certain embodiments, any number of alternator and voltage regulator pairs can be connected in parallel to provide electrical energy. In certain embodiments, any number of voltage regulators can be connected by TxRx connections in a star or daisy chain configuration to provide control by communicating control signals. In certain embodiments, the number of alternator and voltage regulator pairs can vary depending on the amount of electrical energy that is to be generated. In certain embodiments, the number of alternator and voltage regulator pairs can vary depending on the mechanical requirements and limitations to drive the multiplicity of alternator and voltage regulator pairs. In certain embodiments, the configuration of alternator and voltage regulator pairs can vary depending on system requirements and/or design preferences.

Figure 10:
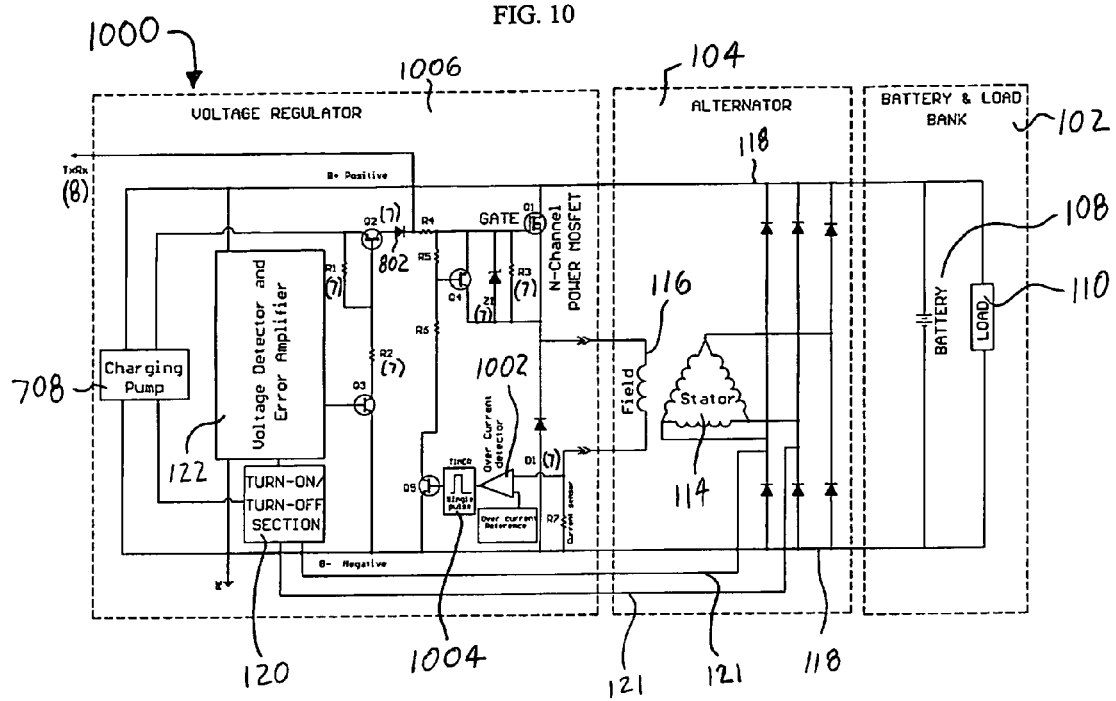
FIG. 10 illustrates a schematic diagram of an electrical system with a voltage regulator-alternator configuration that includes a voltage regulator with fail-safe mechanism used in accordance with an embodiment of the present technology.

FIG. 10 illustrates a schematic diagram of an electrical system 1000 with a voltage regulator-alternator configuration that includes a voltage regulator 1006 with a fail-safe mechanism used in accordance with an embodiment of the present technology. The system 1000 includes elements that are the same as elements shown and described in connection with FIGS. 1 and 7-9. Elements shown in FIG. 10 that are the same as elements shown and described in connection with FIGS. 1 and 7-9 are identified with the same numbers used in connection with FIGS. 1 and 7-9, and can have embodiments (shown and alternative) that are similar to those described in connection with FIGS. 1 and 7-9, for example.

In addition to elements shown and described in connection with FIGS. 1 and 7-9 the system 1000 also includes a fail-safe mechanism comprising an over current detector 1002, a timer 1004, cut-off drives Q4 and Q5 and resistors R5, R6 and R7.

The fail-safe mechanism can disable the switch Q1, such that the switch Q1 does not excite the field 116, when a short circuit occurs across the field 116. That is, a short circuit across the field 116 can damage the switch Q1 by allowing the switch Q1 to remain in the on position, thereby exciting the field 116, without current limitation. Many basic voltage regulators are protected against this condition. The addition of the diode D1(7) combined with a control signal over the connection TxRx(8) that indicates that the switch Q1 should excite the field 116, may, however, effectively disable existing protection.

In the embodiment shown in FIG. 10, the resistor R7 can be located within the drain-source path of the switch Q1, thereby sensing the current level across the switch Q1. The over current detector 1002 can detect a high current condition. When a high current condition is detected, the over current detector 1002 can signal the timer 1004. In certain embodiments, the timer can be a single shot multivibrator, for example. During this signaling, the timer 1004 can disable the switch Q1, so that the switch Q1 does not attempt to excite the field 116, for a period of time. That is, the timer can excite cut-off drive Q5, thereby exciting cut-off drive Q4, and thereby disabling the switch Q1. After the period of time has expired, the switch Q1 can be enabled. If a high current condition still exists, the over current detector 1002 can detect the high current condition and signal the timer 1004. If no high current condition exists, the over current detector 1002 will not detect a high current condition and will not signal the timer 1004.

In the embodiment shown in FIG. 10, resistor R4 is incorporated so that the signal over TxRx(8) will not be disabled when Q4 is disabling the switch Q1. This configuration allows alternator-voltage regulator pairs to continue to function while a connected alternator-voltage regulator pair has its switch Q1 disabled through Q4 being on. In the embodiment shown in FIG. 10, resistors R5 and R6 provide biasing for cut-off drive Q4.

In certain embodiments, a timer can be designed such that a short-circuit condition is detected around 10 to 300 microseconds, for example. In certain embodiments, a timer can be designed such that when a short-circuit condition is detected, the timer triggers a time pulse with a duration around 10 to 20 milliseconds, for example. In certain embodiments, a duty cycle of 0.1% to 1.5% for the short-circuit condition seen by a switch can be provided, for example.

Figure 11:
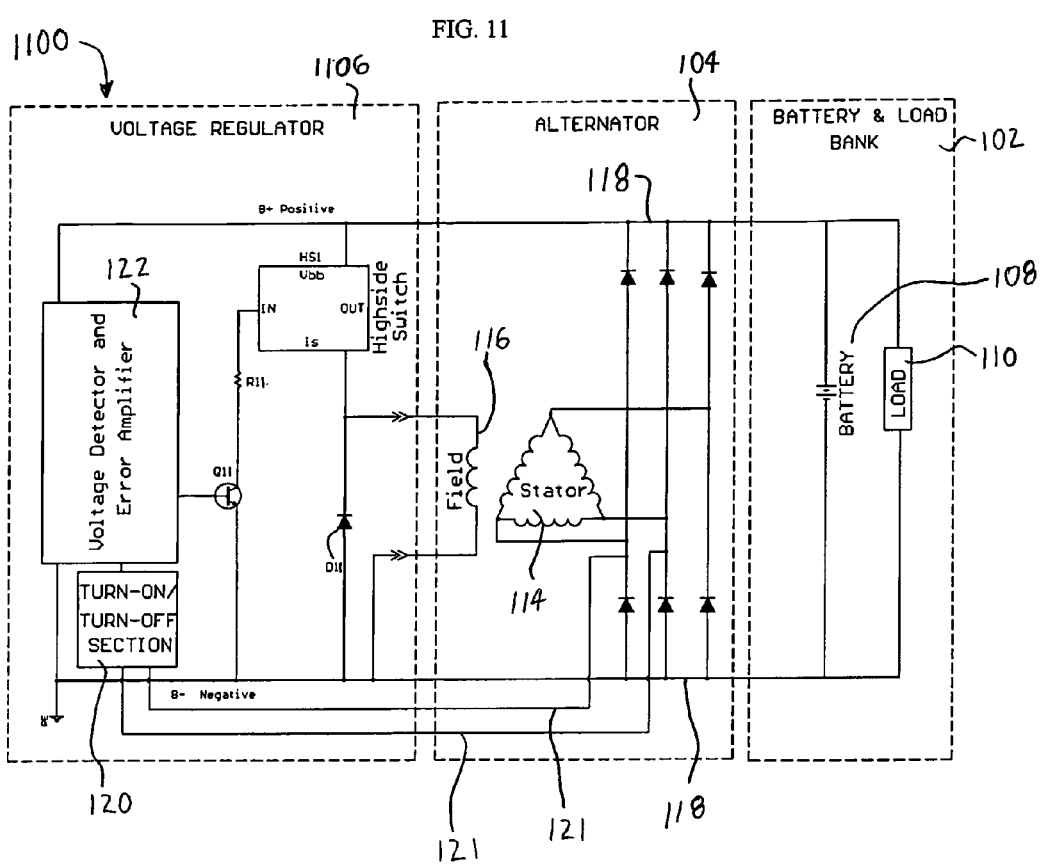
FIG. 11 illustrates a schematic diagram of an electrical system with a voltage regulator-alternator configuration that includes a basic voltage regulator with a high-side switch.

FIG. 11 illustrates a schematic diagram of an electrical system 1100 with a voltage regulator-alternator configuration that includes a basic voltage regulator 1106 with a high-side switch. The system 1100 includes elements that are the same as elements shown and described in connection with FIG. 1. Elements shown in FIG. 11 that are the same as elements shown and described in connection with FIG. 1 are identified with the same numbers used in connection with FIG. 1, and can have embodiments (shown and alternative) that are similar to those described in connection with FIG. 1, for example.

In addition to certain elements shown and described in connection with FIG. 1, the system 1100 also includes: a high-side switch HS1, cut-off drive Q11, diode D11, and resistor R11. In the embodiment shown in FIG. 11, the high side switch HS1 is an integrated switch with built in functionality. In certain embodiments, the high side switch HS1 can include: circuitry for an N-Channel MOSFET with a single voltage signal applied to one of its terminals (input control terminal), a charging pump and/or over-current protection circuitry, for example. In the embodiment shown in FIG. 11, the high side switch HS1 is located between B+ (positive) and an end of the field 116. In the embodiment shown in FIG. 11, the other end of the field is attached to B− (negative). In the embodiment shown in FIG. 11, D11 is a fly-wheel diode located across the field 116.

In the embodiment shown in FIG. 11, the voltage detector and error amplifier 122 can control the switch HS1 by enabling or disabling cut-off drive Q11. That is, the voltage detector and error amplifier 122 can generate a high or low voltage level output based on the voltage detected across B+ (positive) and B− (negative), which voltage corresponds to the voltage output of the alternator 104. For example, when the voltage detected across B+ (positive) and B− (negative) is lower than the voltage detector and error amplifier's internal reference, the voltage detector and error amplifier 122 can generate a high voltage level. When the voltage detector and error amplifier 122 generates a high voltage, cut-off drive Q11 can be enabled (turned on). When cut-off drive Q11 is enabled, the switch HS1 can excite the field 116, thereby increasing the electrical energy output by the alternator 104. For example, when the voltage detected across B+ (positive) and B− (negative) is higher than the voltage detector and error amplifier's internal reference, the voltage detector and error amplifier 122 can generate a low voltage level. When the voltage detector and error amplifier 122 generates a low voltage, cut-off drive Q11 can be disabled (turned off). When cut-off drive Q11 is disabled, the switch HS1 can de-excite the field 116, thereby decreasing the electrical energy output by the alternator 104.

In certain embodiments, a voltage regulator used in the system 1100 can include a high side switch that is a PROFET BTS660P made by Infineon Technologies AG, for example.

Figure 12:
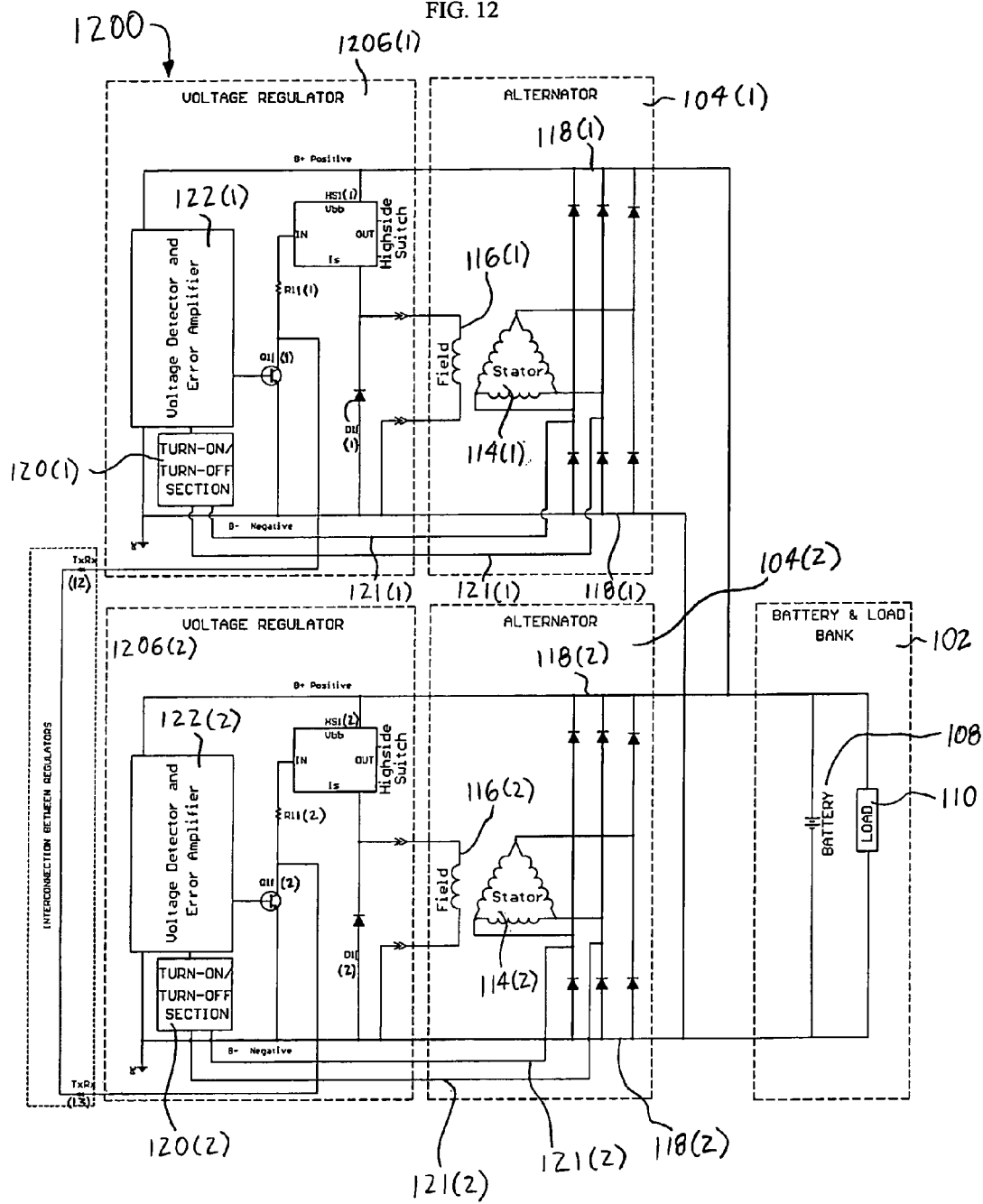
FIG. 12 illustrates a schematic diagram of an electrical system with a voltage regulator-alternator configuration used in accordance with an embodiment of the present technology.

FIG. 12 illustrates a schematic diagram of an electrical system 1200 with a voltage regulator-alternator configuration used in accordance with an embodiment of the present technology. The system 1200 includes elements that are the same as elements shown and described in connection with FIGS. 1 and 11. Elements shown in FIG. 12 that are the same as elements shown and described in connection with FIGS. 1 and 11 are identified with the same numbers used in connection with FIGS. 1 and 11, and can have embodiments (shown and alternative) that are similar to those described in connection with FIGS. 1 and 11, for example.

In addition to elements shown and described in connection with FIGS. 1 and 11, the system 1200 also includes: connections TxRx(12) and TxRx(13). In the embodiment shown in FIG. 12, the connection TxRx(12) provides a connection from the node formed by cut-off drive Q1(1) and switch HS1(1) of voltage regulator 1206(1) to a connecting point. Similarly, the connection TxRx(13) provides a connection from the node formed by cut-off drive Q1(2) and switch HS1(2) of voltage regulator 1206(2) to a connecting point. The connections TxRx(12) and TxRx(13) can be used to transmit a control signal from their respective voltage detector and error amplifiers 122(1), 122(2) to another voltage regulator that is similarly configured. The connections TxRx(12) and TxRx(13) can be used to receive a control signal from another voltage regulator that is similarly configured. In certain embodiments, connections TxRx(12) and TxRx(13) can be a bi-directional buses. In certain embodiments, the connections TxRx(12) and TxRx(13) can be anything that allow a control signal to be transmitted and received between voltage regulators.

Voltage regulators that are configured as shown and described in connection with FIG. 2 can be referred to as "Multipower Voltage Regulators."

The voltage regulator 1206(1) shown and described in connection with FIG. 12 can be used in connection with an electrical system that only includes one alternator and one voltage regulator. In such an embodiment, the connection TxRx(12) is not connected to another voltage regulator and, thus, cannot receive a control signal from another voltage regulator. In such an embodiment, when the connection TxRx (12) is not connected to another voltage regulator, the voltage regulator will function as a basic voltage regulator, such as the voltage regulator shown and described in connection with FIG. 11, for example.

FIG. 12 illustrates an electrical system 1200 with two alternators 104(1), 104(2) connected in parallel and providing electrical energy to a single battery and load bank 102. Each alternator 104(1), 104(2) has an associated voltage regulator 1206(1), 1206(2). The voltage regulators 1206(1), 1206(2) are connected by connections TxRx(12), TxRx(13).

In operation, each voltage detector and error amplifier 122 (1), 122(2) can generate a control signal based on the output voltage across B+ and B− of the whole electrical system. That is, because the alternators 104(1), 104(2) are on a parallel connection, the voltage detected by both voltage detector and error amplifiers 122(1), 122(2) is basically the same and corresponds to the voltage across B+ and B− of the whole electrical system. Thus, a voltage difference if any is only a function of the wiring voltage drop between each voltage detector and error amplifier 122(1), 122(2). The control signals can then be communicated to all connected voltage regulators 906(1), 906(2). If all control signals indicate that the voltage output of the system 1200 is too high, all switches HS1(1), HS1(2) can de-excite fields 116(1), 116(2), thereby decreasing the electrical energy output by alternators 104(1), 104(2). If any control signal indicates that the voltage output of the system 1200 is too low, all switches HS1(1), HS1(2) can excite fields 116(1), 116(2), thereby increasing the electrical energy output by all alternators 104(1), 104(2).

In certain embodiments, any number of alternator and voltage regulator pairs can be connected in parallel to provide electrical energy. In certain embodiments, any number of voltage regulators can be connected by TxRx connections in a star or daisy chain configuration to provide control by communicating control signals. In certain embodiments, the number of alternator and voltage regulator pairs can vary depending on the amount of electrical energy that is to be generated. In certain embodiments, the number of alternator and voltage regulator pairs can vary depending on the mechanical requirements and limitations to drive the multiplicity of alternator and voltage regulator pairs. In certain embodiments, the configuration of alternator and voltage regulator pairs can vary depending on system requirements and/or design preferences.

Figure 13:
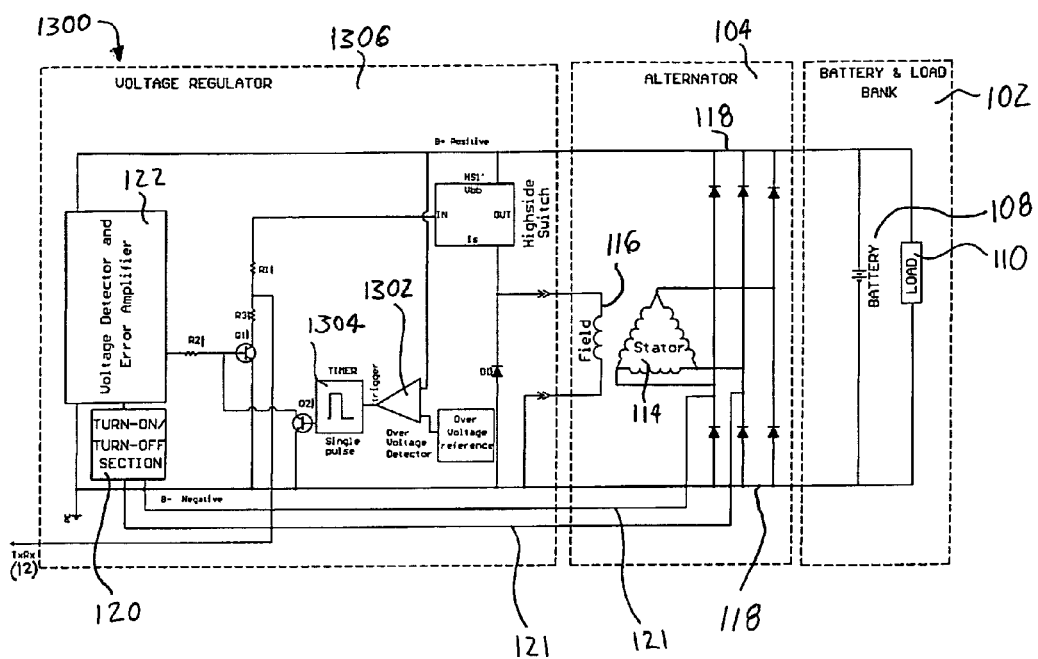
FIG. 13 illustrates a schematic diagram of an electrical system with a voltage regulator-alternator configuration that includes a voltage regulator with fail-safe mechanism used in accordance with an embodiment of the present technology.

FIG. 13 illustrates a schematic diagram of an electrical system 1300 with a voltage regulator-alternator configuration that includes a voltage regulator 1306 with fail-safe mechanism used in accordance with an embodiment of the present technology. The system 1300 includes elements that are the same as elements shown and described in connection with FIGS. 1 and 11-12. Elements shown in FIG. 13 that are the same as elements shown and described in connection with FIGS. 1 and 11-12 are identified with the same numbers used in connection with FIGS. 1 and 11-12, and can have embodiments (shown and alternative) that are similar to those described in connection with FIGS. 1 and 11-12, for example.

In addition to elements shown and described in connection with FIGS. 1 and 11-12 the system 1300 also includes a fail-safe mechanism comprising an over voltage detector 1302, a timer 1304, a cut-off drive Q21 and resistors R21 and R31. In the embodiment shown in FIG. 13, the fail-safe mechanism can be used to avoid a runaway condition resulting from a short circuit between the connection TxRx(12) and B− (negative). A runaway condition occurs when an electrical system functions without being regulated, for example, by a voltage regulator. That is, a short circuit between the connection TxRx(12) and B− (negative) can cause the switch HS1 to excite the field 116 without control, thereby creating a high voltage condition. The over voltage detector 1302 can detect a high voltage condition. When a high voltage condition is detected, the over voltage detector 1302 can signal the timer 1304, which can be a mono-stable multivibrator, for example. During this signaling, the timer 1304 can signal the cut-off drive Q21 to stop any high voltage from reaching the gate control input terminal "IN" of the high-side switch HS1, thereby disabling the switch HS1, so that the switch HS1 does not excite the field 116 for a period of time. After the period of time has expired, the switch HS1 can be enabled. If a high voltage condition still exists, the over voltage detector 1302 can detect the high voltage condition and signal the timer 1304. If no high voltage condition exists, the over voltage detector 1302 will not detect a high voltage condition and will not signal the timer 1304. In certain embodiments, timer specifications and system thresholds are such that a fail-safe operating mode with a duty cycle of 0.1% to 1% is triggered when a high voltage condition occurs, for example.

In the embodiment shown in FIG. 13, resistor R21 can be added (or relocated from the inside of the voltage detector and error amplifier 122) in order to avoid damage to cut-off drive Q21 and/or the voltage detector and error amplifier 122. In the embodiment shown in FIG. 13, resistor R31 can be added to protect cut-off drive Q1 in the case of a short circuit between connection TxRx(12) and B+ (positive).

Embodiments of the systems shown and described in connection with FIGS. 1-13 can be implemented as discrete components, integrated circuits, Microprocessor and/or ASIC based designs. Embodiments of the systems can vary based on the level of technology used to implement the voltage regulators and/or based on design requirements and/or preferences. For example, in certain embodiments, a voltage regulator-alternator configuration can include a voltage regulator that includes a low side switch, such as those shown and described in connection with FIGS. 1-6, for example. For example, in certain embodiments, a voltage regulator-alternator configuration can include a voltage regulator that includes a high side switch, such as those shown and described in connection with FIGS. 7-13, for example. For example, in certain embodiments, a voltage regulator-alternator configuration can include a Frequency On Demand (FOD) voltage regulator and/or a Pulse Width Modulation (PWM) voltage regulator.

Embodiments of the systems shown and described in connection with FIGS. 1-13 can include voltage regulators that operate at any voltage range. For example, in certain embodiments, a vehicular electrical system can include a voltage regulator that operates at 12V nominal and regulates around 14V. For example, in certain embodiments, a vehicular electrical system can include a voltage regulator that operates at 24V nominal and regulates around 28V. For example, in certain embodiments, an electrical system without a battery can include a voltage regulator that operates and regulates around 48V. For example, in certain embodiments, an electrical system with a battery can include a voltage regulator that operates and regulates around 56V.

Figure 14:
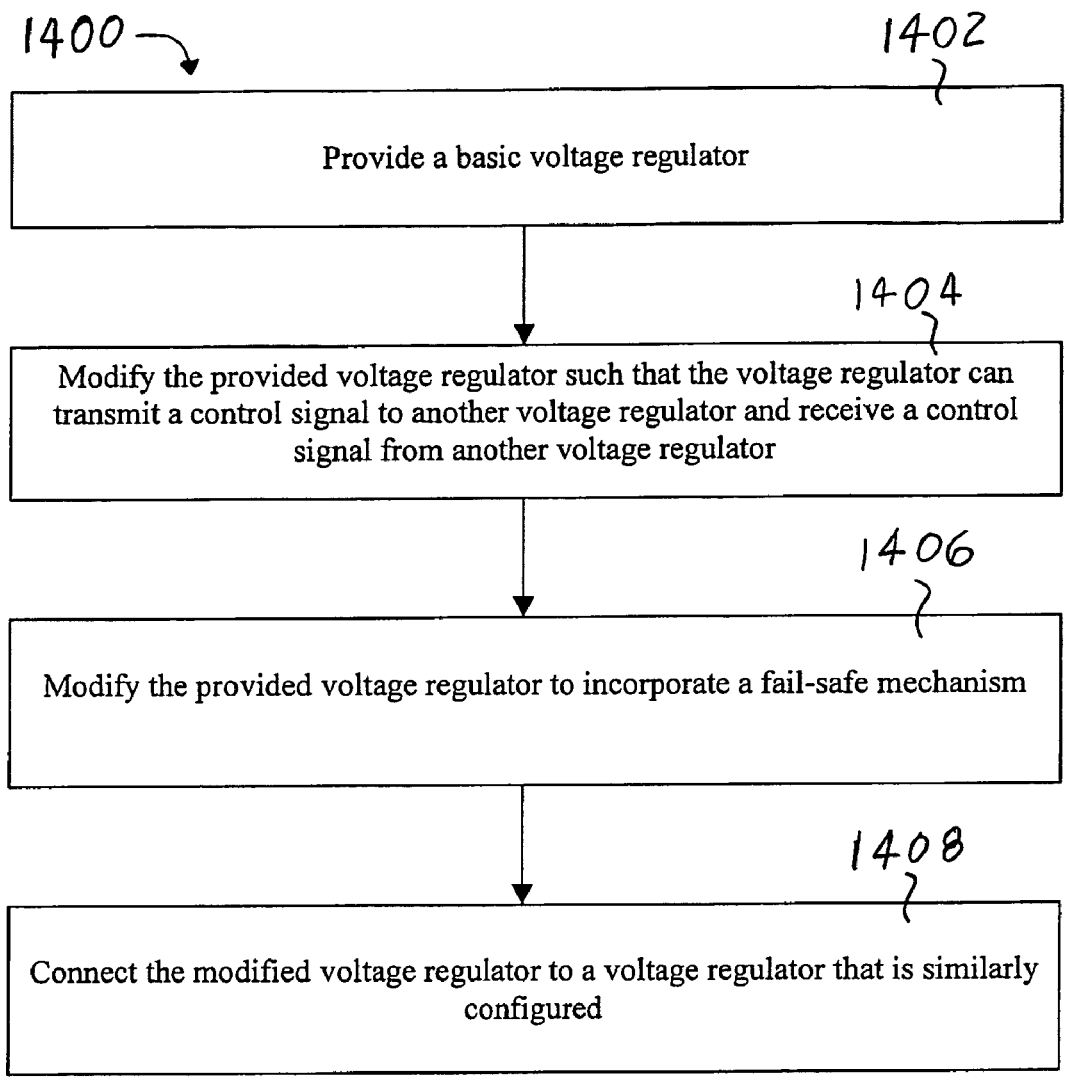
FIG. 14 illustrates flow chart of a method of converting a basic voltage regulator into a voltage regulator used in accordance with an embodiment of the present technology.

FIG. 14 illustrates a flow chart of a method of converting a basic voltage regulator into a voltage regulator used in accordance with an embodiment of the present technology. At 1402, a basic voltage regulator is provided. For example, in certain embodiments, a basic voltage regulator similar to the voltage regulator 106 shown and described in connection with FIG. 1, can be provided. For example, in certain embodiments, a basic voltage regulator similar to the voltage regulator 706 shown and described in connection with FIG. 7, can be provided. For example, in certain embodiments, a basic voltage regulator similar to the voltage regulator 1106 shown and described in connection with FIG. 11, can be provided.

At 1404, a basic voltage regulator is modified such that the voltage regulator can transmit a control signal to another voltage regulator and receive a control signal from another voltage regulator. For example, in certain embodiments, a basic voltage regulator similar to the voltage regulator 106 shown and described in connection with FIG. 1, can be modified to be similar to the voltage regulator 206 shown and described in connection with FIG. 2. For example, in certain embodiments, a basic voltage regulator similar to the voltage regulator 706 shown and described in connection with FIG. 7, can be modified to be similar to the voltage regulator 806 shown and described in connection with FIG. 8. For example, in certain embodiments, a basic voltage regulator similar to the voltage regulator 1106 shown and described in connection with FIG. 11, can be modified to be similar to the voltage regulator 1206(1) shown and described in connection with FIG. 12.

At 1406, a fail-safe mechanism is incorporated into a modified voltage regulator. For example, in certain embodiments, a fail-safe mechanism, such as a fail-safe mechanism shown and described in connection with FIGS. 4-6, can be incorporated into a voltage regulator that has been modified to be similar to the voltage regulator 206 shown and described in connection with FIG. 2. For example, in certain embodiments, a fail-safe mechanism, such as the fail-safe mechanism shown and described in connection with FIG. 10, can be incorporated into a voltage regulator that has been modified to be similar to the voltage regulator 806 shown and described in connection with FIG. 8. For example, in certain embodiments, a fail-safe mechanism, such as the fail-safe mechanism shown and described in connection with FIG. 13, can be incorporated into a voltage regulator that has been modified to be similar to the voltage regulator 1206(1) shown and described in connection with FIG. 12.

At 1408, a modified voltage regulator is connected to a similarly configured voltage regulator. For example, in certain embodiments, a voltage regulator that has been modified to be similar to the voltage regulator 206 shown and described in connection with FIG. 2 can be connected to a similar voltage regulator. For example, in certain embodiments, two similar voltage regulators can be connected as shown and described in connection with FIG. 3. For example, in certain embodiments, a voltage regulator that has been modified to be similar to the voltage regulator 806 shown and described in connection with FIG. 8 can be connected to a similar voltage regulator. For example, in certain embodiments, two similar voltage regulators can be connected as shown and described in connection with FIG. 9. For example, in certain embodiments, a voltage regulator that has been modified to be similar to the voltage regulator 1206(1) shown and described in connection with FIG. 12 can be connected to a similar voltage regulator. For example, in certain embodiments, two similar voltage regulators can be connected as shown and described in connection with FIG. 12.

Applying the method 1400 as described above, and/or in light of the embodiments described in connection with FIGS. 1-13, can simplify voltage regulator production, reduce voltage regulator inventories, eliminate the need for complex alternator-voltage regulator configurations and/or provide equivalent spare parts for voltage regulators. Thus, applying the method 1400 as described above, and/or in light of the embodiments described in connection with FIGS. 1-13, can result in economic and commercial advantages over existing alternator-voltage regulator configurations.

While the invention has been described with reference to embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. An electrical system comprising:
a plurality of alternator-voltage regulator pairs connected in parallel for providing electric power, the plurality of alternator-voltage regulator pairs including a first voltage regulator paired with a first alternator and a second voltage regulator paired with a second alternator,
the first voltage regulator configured to transmit a first control signal to the second voltage regulator, the first control signal indicating whether the voltage output of the electrical system is above or below a target voltage,
the second voltage regulator configured to transmit a second control signal to the first voltage regulator, the second control signal indicating whether the voltage output of the electrical system is above or below the target voltage.

2. The system of claim 1, wherein the first voltage regulator is configured to increase voltage output of the first alternator if the first control signal indicates that the voltage output of the electrical system is below the target voltage or if the second control signal indicates that the voltage output of the electrical system is below the target voltage, and
wherein the second voltage regulator is configured to increase voltage output of the second alternator if the first control signal indicates that the voltage output of the electrical system is below the target voltage or if the second control signal indicates that the voltage output of the electrical system is below the target voltage.

3. The system of claim 1, wherein the first voltage regulator is configured to decrease voltage output of the first alternator if the first control signal indicates that the voltage output of the electrical system is above the target voltage and the second control signal indicates that the voltage output of the electrical system is above the target voltage, and
wherein the second voltage regulator is configured to decrease voltage output of the second alternator if the first control signal indicates that the voltage output of the electrical system is above the target voltage and the second control signal indicates that the voltage output of the electrical system is above the target voltage.

4. The system of claim 1, further comprising a connection over which control signals can be communicated between the first voltage regulator and the second voltage regulator.

5. The system of claim 4, wherein the connection is a bi-directional bus.

6. The system of claim 1, further comprising a battery, wherein the plurality of alternator-voltage regulator pairs provide electric power to the battery.

7. The system of claim 1, further comprising an electric load consumer, wherein the plurality of alternator-voltage regulator pairs provide electric power to the electric load consumer.

8. The system of claim 1, wherein the electrical system is the electrical system of a vehicle.

9. The system of claim 1, wherein the first voltage regulator comprises:
a voltage detector and error amplifier configured to (i) detect the voltage output of the electrical system, (ii) compare the detected voltage to the target voltage, and (iii) transmit the first control signal; and
an electronic switch configured to (i) receive the first control signal and the second control signal, (ii) excite the field of the first alternator if the first control signal indicates that the voltage output of the electrical system is below the target voltage or if the second control signal indicates that the voltage output of the electrical system is below the target voltage, and (iii) de-excite the field of the first alternator if the first control signal indicates that the voltage output of the electrical system is above the target voltage and the second control signal indicates that the voltage output of the electrical system is above the target voltage.

10. The system of claim 9, wherein the electronic switch is a high-side switch.

11. The system of claim 9, wherein the electronic switch is a low-side switch.

12. The system of claim 9, wherein the first voltage regulator is a frequency on demand voltage regulator.

13. The system of claim 9, wherein the first voltage regulator is a pulse width modulation voltage regulator.

14. The system of claim 9, wherein the first voltage regulator further includes a fail-safe mechanism configured to detect a high voltage condition and disable the electronic switch for a certain period of time when the high voltage condition is detected, the fail-safe mechanism comprising:
an over voltage detector configured to detect a voltage and transmit a first signal if the detected voltage is above a certain point;
a timer configured to receive the first signal from the over voltage detector and transmit a second signal for a certain period of time when the first signal is received; and
a cut-off drive configured to receive the second signal from the timer and disable the electronic switch while the second signal is received.

15. The system of claim 9, wherein the first voltage regulator further includes a fail-safe mechanism configured to detect a high current condition, and disable the electronic switch for a certain period of time when the high current condition is detected, the fail-safe mechanism comprising:
an over current detector configured to detect a current across the electronic switch, and transmit a first signal if the current is above a certain point; and
a timer configured to receive the first signal from the over current detector and transmit a second signal for a certain period of time when the first signal is received; and
a cut-off drive configured to receive the second signal from the timer and disable the electronic switch while the second signal is received.

16. A method of configuring an electrical system comprising a plurality of alternator-voltage regulator pairs connected in parallel for providing electric power, the plurality of alternator-voltage regulator pairs including a first voltage regulator paired with a first alternator and a second voltage regulator paired with a second alternator, the method comprising:
providing a connection over which control signals can be communicated between the first voltage regulator and the second voltage regulator;
configuring the first voltage regulator to transmit a first control signal to the second voltage regulator, the first control signal indicating whether the voltage output of the electrical system is above or below a target voltage; and configuring the second voltage regulator to transmit a second control signal to the first voltage regulator, the second control signal indicating whether the voltage output of the electrical system is above or below the target voltage.

17. The method of claim 16, wherein the first voltage regulator is configured to increase voltage output of the first alternator if the first control signal indicates that the voltage output of the electrical system is below the target voltage or if the second control signal indicates that the voltage output of the electrical system is below the target voltage, and wherein the second voltage regulator is configured to increase voltage output of the second alternator if the first control signal indicates that the voltage output of the electrical system is below the target voltage or if the second control signal indicates that the voltage output of the electrical system is below the target voltage.

18. The method of claim 16, wherein the first voltage regulator is configured to decrease voltage output of the first alternator if the first control signal indicates that the voltage output of the electrical system is above the target voltage and the second control signal indicates that the voltage output of the electrical system is above the target voltage, and wherein the second voltage regulator is configured to decrease voltage output of the second alternator if the first control signal indicates that the voltage output of the electrical system is above the target voltage and the second control signal indicates that the voltage output of the electrical system is above the target voltage.

19. A method of controlling an electrical system comprising a plurality of alternator-voltage regulator pairs connected in parallel for providing electric power, the plurality of alternator-voltage regulator pairs including a first voltage regulator paired with a first alternator and a second voltage regulator paired with a second alternator, the method comprising:

using the first voltage regulator to transmit a first control signal to the second voltage regulator, the first control signal indicating whether the voltage output of the electrical system is above or below a target voltage; and using the second voltage regulator to transmit a second control signal to the first voltage regulator, the second control signal indicating whether the voltage output of the electrical system is above or below the target voltage.

20. The method of claim 19, wherein the first voltage regulator is configured to increase voltage output of the first alternator if the first control signal indicates that the voltage output of the electrical system is below the target voltage or if the second control signal indicates that the voltage output of the electrical system is below the target voltage, and wherein the second voltage regulator is configured to increase voltage output of the second alternator if the first control signal indicates that the voltage output of the electrical system is below the target voltage or if the second control signal indicates that the voltage output of the electrical system is below the target voltage.

21. The method of claim 19, wherein the first voltage regulator is configured to decrease voltage output of the first alternator if the first control signal indicates that the voltage output of the electrical system is above the target voltage and the second control signal indicates that the voltage output of the electrical system is above the target voltage, and wherein the second voltage regulator is configured to decrease voltage output of the second alternator if the first control signal indicates that the voltage output of the electrical system is above the target voltage and the second control signal indicates that the voltage output of the electrical system is above the target voltage.

* * * * *